United States Patent

[11] 3,623,974

[72] Inventors William R. Mounce
 Cranbury;
 Roger P. Van Driesen, Hopewell, both of N.J.
[21] Appl. No. 883,814
[22] Filed Dec. 10, 1969
[45] Patented Nov. 30, 1971
[73] Assignee Cities Service Research and Development Company
 New York, N.Y.

[54] HYDROTREATING A HEAVY HYDROCARBON OIL IN AN EBULLATED CATALYST ZONE AND A FIXED CATALYST ZONE
 4 Claims, 1 Drawing Fig.
[52] U.S. Cl. .................................................. 208/97, 208/59
[51] Int. Cl. ....................................................... C10g 37/06
[50] Field of Search .......................................... 208/97, 209, 210, 211, 212, 213, 59

[56] References Cited
UNITED STATES PATENTS

| | | | |
|---|---|---|---|
| 2,908,627 | 10/1959 | Hemminger | 208/213 |
| 3,050,459 | 8/1962 | Schuman | 208/97 |
| 3,183,179 | 5/1965 | Schuman | 208/97 |
| 3,188,286 | 6/1965 | Van Driesen | 208/110 UX |
| 3,291,721 | 12/1966 | Schuman | 208/97 |
| 3,418,234 | 12/1968 | Chervenak | 208/59 |

Primary Examiner—Paul M. Coughlan, Jr.
Assistant Examiner—G. J. Crasanakis
Attorney—J. Richard Geaman ABSTRACT: A process is shown for the hydrotreating of a heavy hydrocarbon feed in an ebullated-bed reaction zone and the fixed bed hydrotreating of a vacuum gas-oil fraction of the liquid product from the ebullated-bed reaction zone. The process comprises: treating the heavy hydrocarbon feed at high pressures above 1,700 p.s.i.g. and temperatures above 750° F. with hydrogen in the presence of the ebullated catalyst bed; withdrawing the treated liquid hydrocarbon from the reaction zone; reducing the pressure of said withdrawn liquid to 1,500 p.s.i. to flash off a hydrocarbon vapor stream containing hydrogen leaving a reduced pressure liquid hydrocarbon stream; fractionating the reduced pressure liquid stream to obtain a gas-oil fraction containing sulfur; and contacting the gas-oil fraction with the reduced pressure hydrocarbon vapor stream in the presence of a fixed bed of hydrotreating catalyst in a second reaction zone maintained at 1,500 p.s.i.g. to thereby hydrotreat the gas-oil fraction.

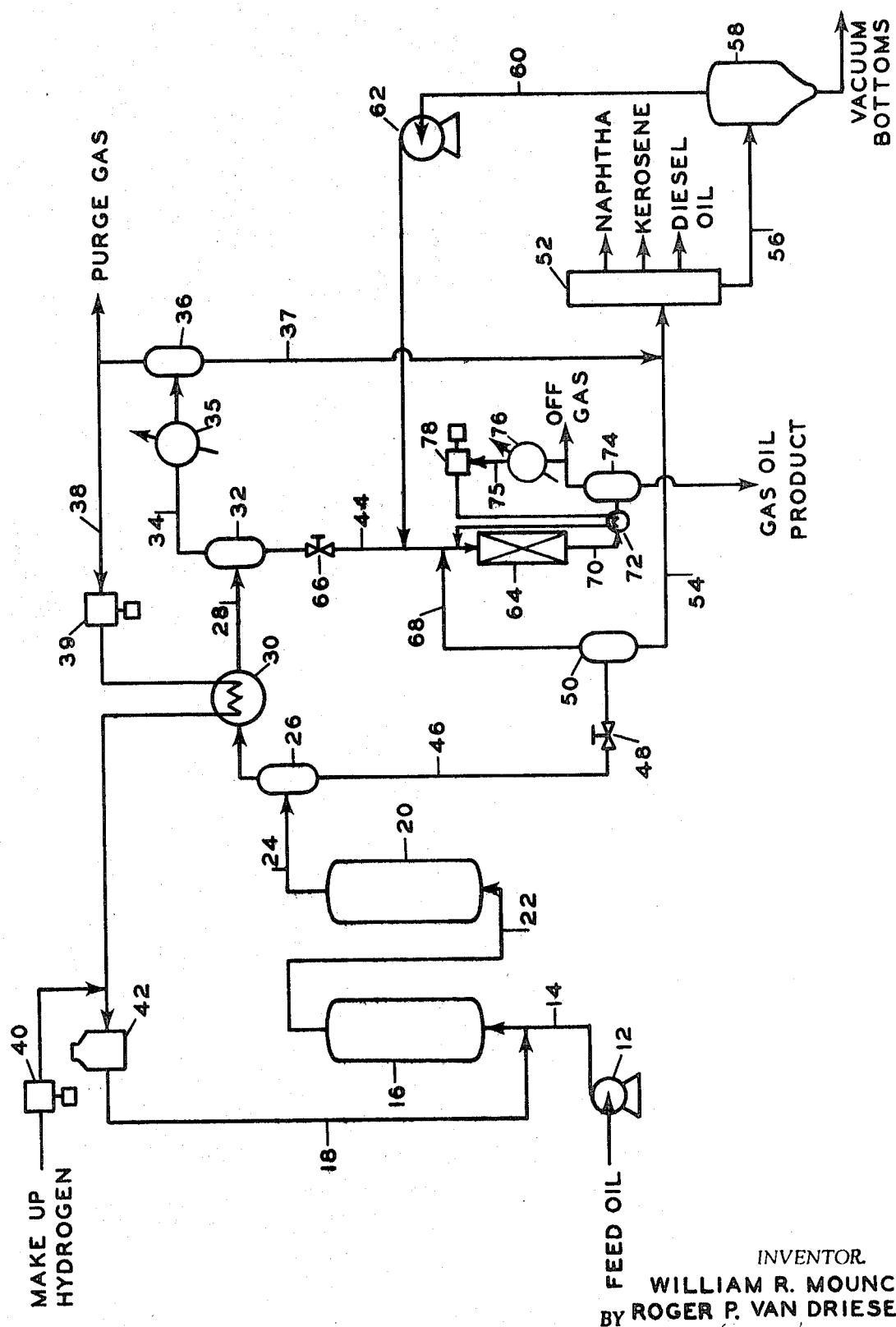

HYDROTREATING A HEAVY HYDROCARBON OIL IN AN EBULLATED CATALYST ZONE AND A FIXED CATALYST ZONE

BACKGROUND OF THE INVENTION

This invention relates to an improved process for the treatment of hydrocarbon oil with hydrogen in the presence of catalyst. A particular commercially utilized process for treating such oils particularly heavy oils is known as the "H-Oil" Process. Such a process is illustrated by U.S. Pat. No. 25,770 issued to E. S. Johanson for Gas-Liquid Contacting Process and U.S. Pat. No. 3,188,286 issued to R. P. Van Driesen for Hydrocracking Heavy Hydrocarbon Oil. In these processes a hydrocarbon oil feed and hydrogen-containing gas is passed upwardly through a bed of particulate catalyst serving to expand the bed and induce random motion among the catalyst particles and being specifically referred to as an ebullated bed. The particulate catalyst is a suitable hydrotreating catalyst a number of which are well known in the art. The reaction zone is maintained at high pressure and temperatures, a pressure above 1000 p.s.i. and a temperature above 650° F. being used. Preferably operating pressures are maintained above 2000 p.s.i.g., being in the 2000 p.s.i.g. to 3000 p.s.i.g. range and temperatures are maintained above 750° F., the preferred range being from 800° to 900° F.

Once treated, hydrocarbon liquid may be withdrawn from the reaction zone, or a portion of the liquid may be recycled either internal or external of the reaction zone, back to the bottom of the reaction zone. Hydrocarbon effluent withdrawn from reaction zone, may be subjected to treatment in a second reaction zone maintained at substantially similar conditions to the first reaction zone. This is particularly applicable where there is no recycling of the treated hydrocarbon oil back to the bottom of the ebullated bed reaction zone.

Product removed from the ebullated bed reaction zones is subjected to gas-liquid separation, recovery and recycling of the vapor stream as a hydrogen containing gas, and subsequent conventional treatment of the liquid stream as by atmospheric or vacuum fractionation to obtain a refinery product stream for subsequent blending or use.

In this context it is often desirable to desulfurize the fractionated gas-oil stream. Various conventional apparatus and methods are available for such desulfurization but insofar as they apply to the product of an H-Oil Process, they represent no improvement in use of equipment and process streams to achieve the fixed bed desulfurization. Ordinarily recovery of valuable hydrogen dissolved in the liquid stream from the ebullated bed reactors is optimally achieved by flashing it from the reactor-operating pressure of about 3000 p.s.i.g. to a pressure of about 1500 p.s.i.g. At this reduced pressure of about 1500 p.s.i.g. the major part of the dissolved hydrogen is recovered in the flash gas. In conventional practice the hydrogen containing flash gas stream is then cooled, and compressed to the ebullated bed reactor pressure of about 3000 p.s.i.g. for recycling back into the reactor. Our invention comprises utilizing the flash gas at its flash pressure and temperature as a source of heat and hydrogen for hydrotreating and preferably desulfurizing a gas-oil fraction from the ebullated bed reactors in a fixed bed hydrotreating unit. The reduced pressure and the temperature at which the ebullated bed reactor liquid is flashed is such that the resulting flash gas stream can be optimally used in the fixed bed hydrotreating unit.

SUMMARY OF THE INVENTION

Accordingly we have invented a process for treating a heavy hydrocarbon oil feed with hydrogen in the presence of an ebullated particulate catalyst bed in which the hydrocarbon oil feed is contacted with a hydrogen containing gas in a reaction zone at a pressure above 1700 p.s.i.g. and temperature above 650° F. in the presence of an ebullated bed of particulate catalyst. The catalyst bed is ebullated by passing the hydrocarbon oil feed and hydrogen containing gas upwardly through the bed at a velocity sufficient to expand the volume occupied by the bed and induce random motion of the particulate catalyst. Treated liquid is withdrawn from the reaction zone, reduced in pressure to below 1700 p.s.i.g. to separate the withdrawn liquid into a hydrocarbon vapor containing hydrogen and a low pressure liquid hydrocarbon stream. The low pressure liquid hydrocarbon stream is fractionated to obtain a gas-oil and the gas-oil stream is contacted with the separated vapor stream in a fixed bed reaction zone in the presence of a fixed bed of hydrotreating catalyst at a pressure below 1700 p.s.i.g., to hydrodesulfurizing and otherwise hydrotreat the gas-oil fraction.

Preferably the ebullated bed reaction zone comprises a pair of reactors, both of which have expanded ebullated catalyst beds, with the product effluent from one of the ebullated bed reactors being fed to the second ebullated bed reactor together with makeup hydrogen if necessary. The gas oil fraction is preferably vacuum gas-oil after the reduced pressure liquid stream has been fractionated in an atmospheric tower and the atmospheric bottoms subjected to vacuum fractionation. The desulfurized vacuum gas-oil is subsequently subjected to vapor-liquid separation to remove hydrogen and hydrogen sulfide vapors therefrom.

It is therefore an object of this invention to provide a process for the hydrotreating of a heavy hydrocarbon feed and the hydrodesulfurization of the gas-oil produce therefrom.

Another object of this invention is to provide a improved process for integrating the ebullated bed hydrotreating of a heavy hydrocarbon oil with the desulfurization of products therefrom.

Other objects and advantages of the process according to this invention will become apparent to those versed in the art from the description of the drawings and preferred embodiment which follow.

BRIEF DESCRIPTION OF THE DRAWING

The drawing illustrates in schematic form the process according to the invention.

DESCRIPTION OF THE PREFERRED EMBODIMENTS

With reference to the drawing wherein the process is shown in schematic form, feed oil is passed from a source not shown through a pump 12 and feed conduit 14 into the bottom of a first ebullated bed reactor vessel 16. Also feeding a hydrogen-containing gas into the bottom of the first reactor vessel 16 is a hydrogen supply pipe 18 connected to the feed conduit 14.

The feed oil may be any heavy hydrocarbon oil having an initial boiling point (IBP) above 600° F., preferably in the range of from 600° F. to 975° F., IBP. Examples of suitable feed oils are atmospheric residuum, vacuum residuum, and various oils boiling in the above range and possessing similar qualities. Such an oil comprising a significant portion of residuum material and having relatively high sulfur content is perfectly suitable for the process of this invention. A hydrogen-containing gas supplied from a source as will be described hereinafter is fed together with the feed oil in the amount of from 2,000 to 10,000 standard cubic feet per barrel of feed (SCF/B) into the first reactor vessel 16. Preferably the hydrogen is in the amount of from 3,000 SCF/B to 6,000 SCF/B. The rate of feed and gas and the size of the reactor vessel are such that the particulate catalyst bed in the reactor is expanded up to five times its quiescent volume and random motion is induced among the particles. For such a purpose space velocity in the reactor may vary widely e.g. between about 0.2 and 5.0 volume of feed per hour per volume of reactor vessel capacity.

The particulate catalyst employed may be any suitable hydrocracking catalyst. Well known suitable catalysts include, for instance, cobalt, iron, nickel, tungsten, molybdenum and combinations thereof. Such catalysts as well as their oxides and sulfides, may be used alone or in combination with other catalysts. The catalysts are supported on suitable bases such as silica, alumina, or combinations thereof. A preferred catalyst is a cobalt-molybdenum catalyst supported on an alumina carrier. The catalyst particle size may range from about one forty-eighth inch to about one-half inch and be of any shape, although elongated extrudates are preferred.

The ebullated bed reactor vessel is maintained at a temperature between about 750° F. and 900° F. and a pressure between about 2,500 p.s.i.g. and 4,000 p.s.i.g. Preferably the temperature is in the range of from 800° to 875° F. and the pressure is in the range of from 2,500 to 3,500 p.s.i.g. with a pressure of about 3,000 p.s.i.g. being most preferable. Effluent from the first reactor is passed to a second reactor vessel 20 via connecting pipe 22 and introduced into the bottom of the second reactor vessel 20. The second reactor vessel also contains an ebullated catalyst bed similar to that in the first vessel and is maintained at similar temperature and pressure conditions to those in the first vessel 16: Flow conditions, catalyst type and composition are also similar to that in the first vessel although this is not necessarily so. For instance temperatures in the second reactor vessel 20 may be higher than in the first vessel and as such it may be maintained at a temperature of from 0° to 100° F. higher than the first vessel temperature.

Effluent from the second reactor vessel 20 is withdrawn from the top of the vessel 20 via an effluent withdrawal conduit 24 to a primary vapor-liquid separator 26 where the liquid components of the effluent are separated from the vapor components. Such separation may if desired be carried out in the upper portion of the second reactor vessel. However for the purpose of describing the present embodiment, the primary vapor-liquid separator 26 is maintained at substantially reactor vessel pressure and temperature and is of conventional construction. The effluent is therefore separated into a primary vapor stream and a primary liquid stream. The primary vapor stream is carried via pipe 28 through a vapor stream cooler 30 to a low temperature gas-liquid separator 32. The cooler 30 lowers the temperature of the primary vapor stream to about 600° F. to 700° F. at which temperature the low temperature gas-liquid separator 32 operates to separate condensed liquid from vapor. The separated vapor stream is withdrawn from the gas-liquid separator via hydrogen recycle pipe 34, further cooled in heat exchanger 35 and fed to a second low temperature separator 36, where additional condensed liquid hydrocarbon is separated and withdrawn through pipe 37 for additional treatment. The separated gas is withdrawn via recycle pipe 38, being purged as necessary and compressed in pump 39 to the pressure being maintained in the first reactor vessel 16 and used to cool the primary vapor stream in cooler 30. Makeup hydrogen gas is supplied from a source not shown to pipe 18 after being brought up to reactor pressure by pump 40. The hydrogen containing vapor stream is heated in furnace 42 prior to being returned to the first reactor vessel 16 as the source of hydrogen. The condensed liquid stream, gas oil, is withdrawn from the low temperature gas-liquid separator through conduit 44 and treated as will be hereinafter described.

The liquid stream from the primary vapor-liquid separator 26 is drawn off through conduit 46, in which conduit a throttling valve 48 is mounted to lower the pressure of the primary liquid stream. After pressure reduction the primary liquid stream is fed via the conduit 46 into a reduced pressure liquid flash drum 50. The reduced pressure liquid flash drum 50 is maintained at a temperature approaching that of the upstream primary vapor-liquid separator 26 and the reactor vessels 16 and 20 but at a substantially reduced pressure of no more than 1,700 p.s.i.g. and more preferably between 1,400 and 1,550 p.s.i.g. Temperature is between 750° F. and 900° F. depending upon upstream temperatures and more preferably between 800° and 875° F. The pressure is reduced to a point where most of the dissolved hydrogen will be flashed off in the flash drum 50. For the particular liquid hydrocarbon contemplated the optimum flash pressure is about 1,500 p.s.i.g., and therefore is preferred for the flash drum 50 in order to flash off as much dissolved hydrogen as practical from the liquid.

The reduced pressure liquid hydrocarbon stream after gas-liquid separation is passed to atmospheric fractionation tower 52 via line 54, where it is separated into desired fractions such as naphtha, kerosene diesel oil and atmospheric bottoms. The liquid hydrocarbon stream from the second low temperature separator 36 is also fed via pipe 37 to the atmospheric fractionation tower 52. The atmospheric bottoms are transferred via pipe 56 to a vacuum tower 58 where the bottoms fraction is separated into heavy gas oil and vacuum bottoms.

The gas oil fraction recycled via recycle pipe 60 through pump 62 to a fixed bed hydrotreating reactor 64. Recycle pipe 60 is connected to conduit 44 from the low temperature gas-liquid separator 32. A throttling valve 66 is mounted in conduit 44 before the connection to the recycle pipe 60 serves to reduce the pressure of the gas oil stream from the low temperature separator to a pressure approximating that maintained in the hydrotreating reactor 64. Another pipe 68 connects the reduced pressure flash drum 50 to pipe 44 through which separated gas primarily hydrogen from the reduced pressure separator is fed the hydrotreating reactor at reactor pressure.

The hydrotreating reactor is preferably a fixed bed hydrodesulfurization unit employing a fixed particulate catalyst bed which may be composed of any suitable catalyst including these listed for use in the ebullated beds of vessels 16 and 20, though catalyst particle size cannot be as small in the fixed bed. Temperature is maintained in the hydrotreating reactor at between 600° F. and 800° F., and preferably about 700° F. while pressure is maintained at from 500 p.s.i.g. up to that of the gas supply from the reduced pressure flash drum 50. Thus, pressure may be from 500 p.s.i.g. to about 1,700 p.s.i.g., though 700 to 1,500 p.s.i.g. is more likely and preferable. The combined gas oil streams are subjected to treatment in the hydrotreating reactor 64 while hydrodesulfurization is the principle result, it should be understood that other effects of catalytically contacting hydrogen with gas-oil occur such as hydrocracking, hydrogenation and denitrogenation. Gas oil from hydrotreating reactor 64 is withdrawn via conduit 70, cooled in heat exchanger 72 and subjected to gas-liquid separation in separator 74. Gas separated from the treated gas oil is withdrawn from the separator 74 through pipe 75, cooled in cooler 76, compressed in compressor 78, used to cool the gas oil effluent from the hydrotreating reactor 64 in heat exchanger 72 and recycled to the hydrotreating reactor 64.

The liquid hydrocarbon stream, hydrotreated gas oil, from gas-liquid separator 74 is withdrawn either as product of for further treatment not shown, as may be desired. Such a gas oil has particular application as a low sulfur-heating fuel for commercial or residential use and therefore is particularly desirable.

To more clearly illustrate the process of this invention the following example is given.

Twenty-five thousand barrels per stream day (BPSD) of atmospheric residuum comprising about 50 percent material boiling between 650° F. and 975° F. and 50 percent material boiling above 975° F. is fed to the first ebullated bed reactor vessel together with about 4,000 standard cubic foot per barrel (SCF/bbl.) of hydrogen. The hydrogen is at a temperature of about 900° F. The first and second ebullated bed vessels are each maintained at a pressure of 3,000 p.s.i.g. and a temperature of about 800° F. Effluent from the second vessel 20 is fed to the primary vapor-liquid separator 26 which is maintained at about 2,990 p.s.i.g. pressure and 800° F. temperature. The primary vapor stream is fed to the low temperature separator 32 which is maintained at a pressure of about 2,970 p.s.i.g. and a temperature of 650° F. About 3,000 BPSD of heavy gas oil is withdrawn from the low temperature separator and used as a portion of the feed for the fixed bed hydrotreating reactor 64.

The primary liquid stream from the primary separator 26 is fed to the reduced pressure flash drum 50 which is maintained at a pressure of about 1,500 p.s.i.g. and a temperature of 800° F. The 1,500 p.s.i.g. flash gas from drum 50 represents about 1,000 SCF per barrel of feed to the fixed bed reactor and 600 CF/bbl. of hydrogen.

After atmospheric and vacuum fractionation about 7,000 BPSD of vacuum gas oil at a temperature of 700° F. is pressurized to 1,500 p.s.i. and recycled as feed to the hydrotreating reactor. Ten thousand BPSD of gas oil is therefore subjected to treatment in the fixed bed hydrotreating reactor. The hydrotreating reactor is maintained at a temperature of about 700° F. and a pressure of about 1,500 p.s.i.g. Effluent from the hydrotreating unit is cooled and subject to gas-liquid separation at a temperature of 600° F. and a pressure of 1,500 p.s.i.g. prior to withdrawing the hydrotreated gas oil as product.

The quantity of hydrogen in the 1,500 p.s.i.g. flash gas is usually slightly more than the amount necessary to desulfurize the gas oil fraction, while the hydrogen partial pressure of about 700 p.s.i.g. to about 1,000 p.s.i.g. resulting from the flashing operation is ordinarily optimum for the fixed bed desulfurization operation. Additionally the gas oil feed streams to the fixed bed hydrotreating unit are also at elevated temperatures of from 650° to 700° F. The temperature of the flash gas is about 800° F. As a result there is sufficient heat in the streams to the fixed bed hydrotreating unit for maintaining it at operating levels, and there is unlike conventional practice therefore no requirement for fired heaters for any of the streams to the fixed bed hydrotreating unit.

Having described our invention, we claim:

1. A process for for hydrotreating a heavy hydrocarbon oil feed comprising:
   a. contacting said hydrocarbon oil feed with hydrogen in an ebullated bed reaction zone at a pressure above 1,700 p.s.i.g. and at a temperature between about 650° and 900° F. and with an ebullated bed of particulate catalyst selected from the group consisting of a Group VI-B metal, iron group metal, the oxide or sulfide of said metals, and mixtures thereof, by passing said hydrocarbon oil feed and a hydrogen-containing gas upwardly through said catalyst bed at sufficient velocity to expand said bed and induce random motion of said particulate catalyst therein;
   b. separating a primary liquid hydrocarbon stream from the reaction effluent of said reaction zone;
   c. reducing the pressure on said primary liquid hydrocarbon to between about 1,400 p.s.i.g. and 1,550p.s.i.g. thereby separating said primary liquid hydrocarbon into a vapor phase stream containing hydrogen gas and a secondary liquid hydrocarbon stream;
   d. fractionating said secondary liquid hydrocarbon at about atmospheric pressure to obtain naphtha, kerosene, diesel oil and atmospheric bottoms;
   e. vacuum fractionating said atmospheric bottoms to obtain a vacuum gas oil fraction boiling between 600° F. and 975° F;
   f. contacting said vacuum gas oil fraction with said primary vapor stream in a fixed bed hydrotreating zone with a particulate catalyst selected from the group, as identified in step (a), said zone being maintained at a pressure of between 500 p.s.i.g. and 1,550 p.s.i.g. and at a temperature between 600° and 800° F. and
   g. withdrawing a gas oil product.

2. The process of claim 1 wherein said pressure reduction in step (c) is to about 1,500 p.s.i.

3. The process of claim 1 wherein said ebullated bed reaction zone comprises first and second ebullated bed reaction zones, said process additionally comprising feeding the effluent from said first ebullated bed reaction zone to said second ebullated bed reaction zone, withdrawing effluent from said second ebullated bed reaction zone, and separating said effluent into said primary liquid hydrocarbon stream and a primary vapor stream.

4. The process of claim 3 wherein a treated gas oil from step (g) is separated into a gas stream and said gas oil product, and said gas stream is recycled to said fixed bed hydrotreating zone.

* * * * *